United States Patent

[11] 3,624,606

[72] Inventor Roger Lefevre
Villebon-sur-Yvette, France

[21] Appl. No. 884,520
[22] Filed Dec. 12, 1969
[45] Patented Nov. 30, 1971
[73] Assignee C.I.T.-Compagnie Industrielle des Telecommunications
Paris, France
[32] Priority Dec. 12, 1968
[33] France
[31] 178011

[54] DATA CORRECTION SYSTEM
20 Claims, 10 Drawing Figs.

[52] U.S. Cl. 340/146.3AG
[51] Int. Cl. G06k 9/12
[50] Field of Search 340/146.3, 172.5

[56] References Cited

UNITED STATES PATENTS

| | | | |
|---|---|---|---|
| 3,069,079 | 12/1962 | Steinbuch et al. | 340/146.3 X |
| 3,234,513 | 2/1966 | Brust | 340/146.3 |
| 3,289,162 | 11/1966 | Jurk et al. | 340/146.3 |
| 3,517,387 | 6/1970 | Andrews et al. | 340/146.3 |
| 3,522,586 | 8/1970 | Kiji et al. | 340/146.3 |

*Primary Examiner*—Maynard R. Wilbur
*Assistant Examiner*—Leo H. Boudreau
*Attorney*—Craig, Antonelli & Hill

ABSTRACT: The information contained in the memory passes through an assembly of windows corresponding to various positionings, and a counter associated with each window counts the sequences of identical valences seen through each window. The result is the validation of the direction which enables the validation of the contents of a division receiving an interference signal, seen through a correction window parallel to the validated direction.

DATA CORRECTION SYSTEM

The invention concerns an arrangement for correcting data stored in a memory and significant of a pattern constituted of lines.

Such patterns include letters, numerals, graphs, outline maps such as weather charts, fingerprints and the like. The invention is employed in an installation for analysis of a pattern, carried by a document or support such as a photograph, diapositive and the like. The pattern is generally scanned with a television camera and converted into logic signals representing black and white areas of the pattern. The pattern is often examined gradually, the memory holding at any one time data representing only part of the pattern.

Once the analysis of a portion of the document is completed, the logic signals obtained are stored in a two-dimensional memory containing a mosaic which is the transcription in coded form of the information carried by the portion of the document. Such a memory may be advantageously constituted by shift registers arranged side by side in a matrix.

Between a given character on the original document and its coded transcription, there may exist sporadic errors which can disrupt the coded information, in the form of optical and electrical interferences (imperfections of or holes in the document or support and stray signals).

The aim of the invention is to remove from the memorized information the disturbances due to these interferences, by referring to criteria obtained from the memorized information itself. Basically, in the amount of memorized coded information which represents a small portion of the document, the variation in the direction of the lines of the patterns is virtually undetectable. If examination of the memorized coded information reveals the existence of a predominant direction in the lines of the pattern, this same direction is accepted as valid for a line, black or white, which presents one or more interruptions, which interruptions are then regarded as interferences and erased.

In accordance with the invention, there is provided an arrangement for correcting data stored in a memory and significant of a pattern constituted of lines, the data being stored in the form of a matrix array of logic signals representing black and white zones of the pattern, each logic signal occupying a division of the matrix array, the arrangement including: a first subassembly for detecting sequences of the same logic signal value by passing the stored data successively through detection windows each constituted by a group of matrix divisions and defining a direction on the pattern; means for selecting one of said directions in accordance with the sequences detected, the selected direction being referred to as the validated direction; and a second subassembly for passing the stored data through a correction window constituted by a group of matrix divisions and having the validated direction, and for applying correction signals to the data passing through the correction window to compensate for any deviation of the pattern direction from the validated direction.

Preferably means are provided for counting the sequences of the same logic signal value passing through each detection window, cooperating with means for selecting a correction window having a direction validated in accordance with the counted values.

The invention will be described in detail by means of one example of its realization, in referring to the accompanying drawings, in which.

Figure 6:
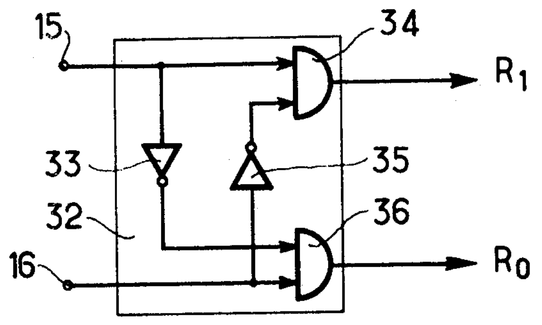
Figure 7A:
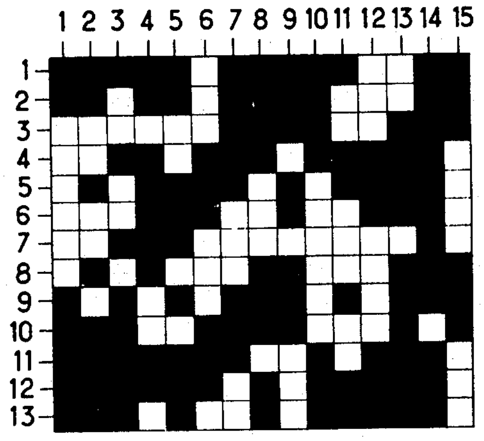
Figure 7B:
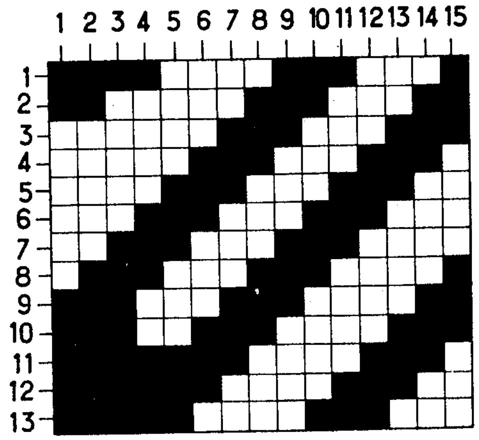

FIGS. *5a*, *5b*, and *5c* show methods of correcting simple or double interferences;

FIG. 6 is a block diagram of a corrector subassembly element; and

FIGS. *7a* and *7b* show, by way of example, a memory zone with interferences and after removal of the interferences by the device according to the invention.

The invention, which is of general application, will be particularly described in detail in the particular case of memorized characters constituting fingerprint lines.

Figure 1:
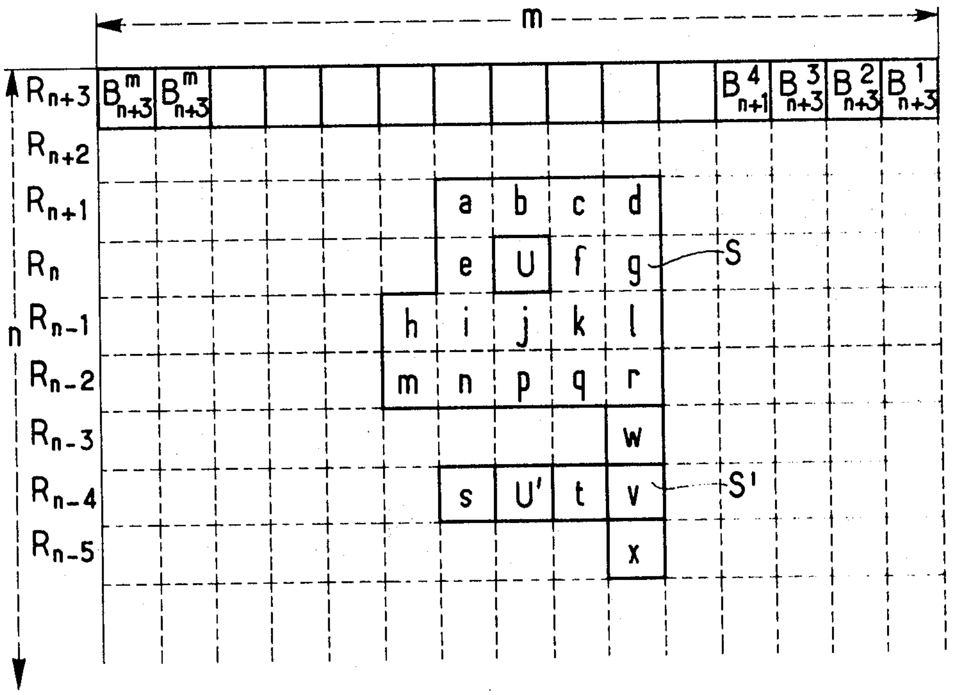
FIG. 1 shows the positions of two detector window assemblies in a matrix memory.

FIG. 1 shows diagrammatically an application of the invention in the particular case of information contained in memory formed by an assembly of *n* shift-registers R each having *m* divisions B. The windows for detection of a validated direction are represented by S, S'. S represents an assembly of principal windows, S' an assembly of auxiliary windows whose function will be explained below.

The memory element under consideration is denoted U. The elements of the assembly S are denoted *a,...p, q, r*. The elements of assembly S' are denoted *s,t,v,w,x*, grouped around an element U'.

The number of directions under investigation has been taken as four in the present case: vertical window (*V*), elements *b, U,j,p;* first diagonal window (*D*), elements *m, i, U, c;* horizontal window (H), elements *e,U,f,g;* second diagonal window (*D'*), elements *a,U,k,r*. It will be understood that the windows may be made longer.

Figure 2:
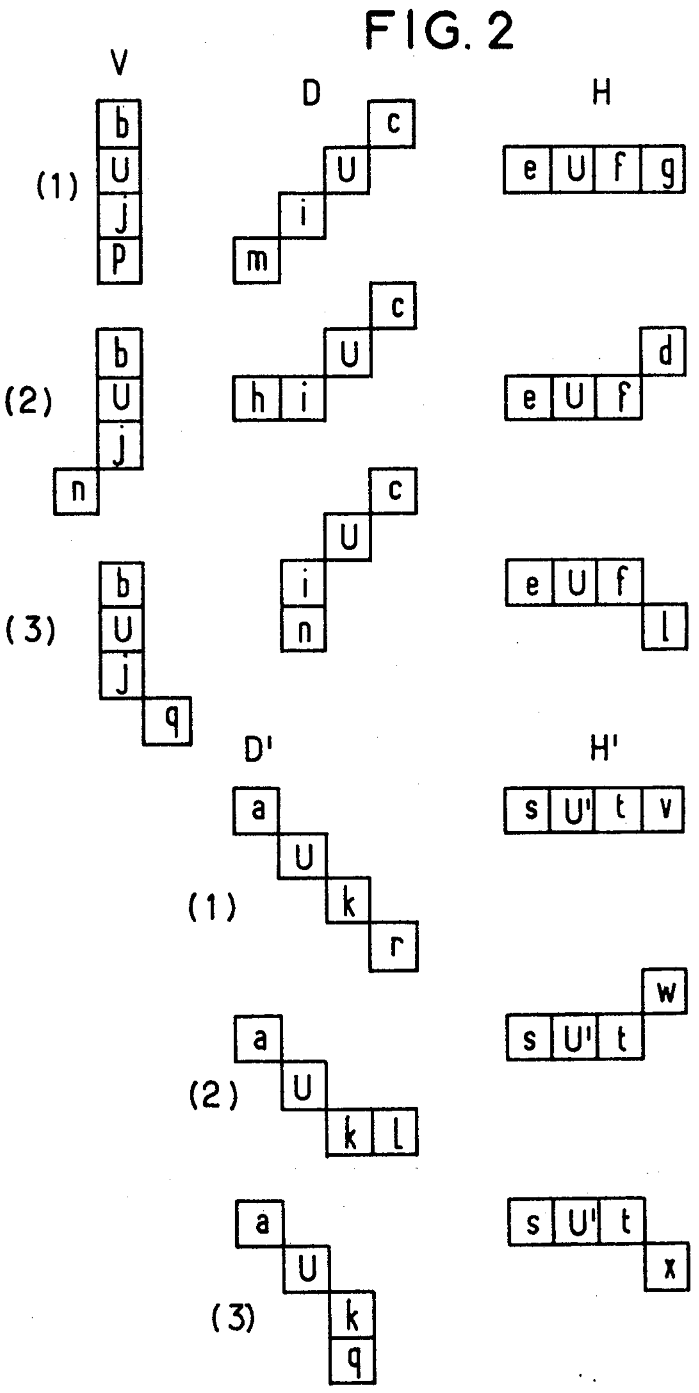
FIG. 2 shows the various individual detector windows.

The individual windows are shown in FIG. 2. The principal directions are represented with the index (1). A determination by simple rectilinear alignment would be too rigid, since the lines of the pattern may present a certain curvature. This is why two complementary windows (2) and (3) have been associated with each principal window, in each of which complementary windows a terminal element of the principal window has been replaced by one or other of two elements adjacent this terminal element.

The various directions V, D,H, D' are controlled by the following logic functions, defined by the corresponding letter:

$$V=bUj(p+n+q)+\bar{b}\bar{U}\bar{j}(\bar{p}+\bar{n}+\bar{q})$$
$$D=cUi(m+h+n)+\bar{c}\bar{U}\bar{i}(\bar{m}+\bar{h}+\bar{n})$$
$$H=eUf(g+d+l)+\bar{e}\bar{U}\bar{f}(\bar{g}+\bar{d}+\bar{l})$$
$$D'=aUk(r+l+q)+\bar{a}\bar{U}\bar{k}(\bar{r}+\bar{l}+\bar{q})$$

The function of windows H' (1,2,3) will be explained below. The existence of the two terms of the second element is due to the fact that a validated direction can be that of a black line or a white line.

The logical functions are examined in a part of the memorized image to control the direction of the lines at all points of the image. It is thus necessary to shift the assembly of validated direction detector windows. In fact, the window assembly is fixed, and it is the information which is shifted. To this end, the information is subjected to a horizontal movement and a vertical movement.

For example, a slow vertical movement could be adopted, corresponding to the changing of the contents of the memory, permitting gradual exploration of juxtaposed segments recorded in any one of the *n* shift-registers constituting the memory. It is still necessary to explore each division of a given register. For this, the window assembly is shifted with a preferably rapid horizontal movement. For example, the vertical movement could be at the rate of about one step every 100 microseconds, while the horizontal movement will be made at a rate of about one step every 1 or 2 microseconds.

The information is passed through each register by looping the register upon itself and cycling the information in all registers simultaneously. The rapid passage of the information in the detector window permits detection by correlation or statistical sampling.

The validation system is much more effective if the oblong window has a direction further removed from the horizontal. In this direction the benefit of statistical sampling is lost, since there is a redundancy of data in four adjacent positions of the memory content which are shifted in the same direction. To reduce this fault and permit the device to effectively correct recurrent interferences in the horizontal sense, the detector element includes the second window assembly S' (FIG. 1) centered on another division U'.

There is thus, in addition, the detection condition:

$H'=sU't\,(v+w+x)+\bar{s}\overline{U'}\bar{t}\,(\bar{v}+\bar{w}+\bar{x})$

As the shifting and correction of the information takes place from top to bottom, the condition $H'$ is applied to a zone which has already been corrected. The result is that the validation condition must be taken as equal to G = *H*hu *H'*, if not there would be a risk of "contamination" from a blot or similar mark, and indefinite propagation of such a mark.

The direction of fingerprint lines does not vary detectably in the memory between the various horizontal positions occupied by the data: this fact is exploited in a way which will be described in relation to FIG. 3.

Figure 3:
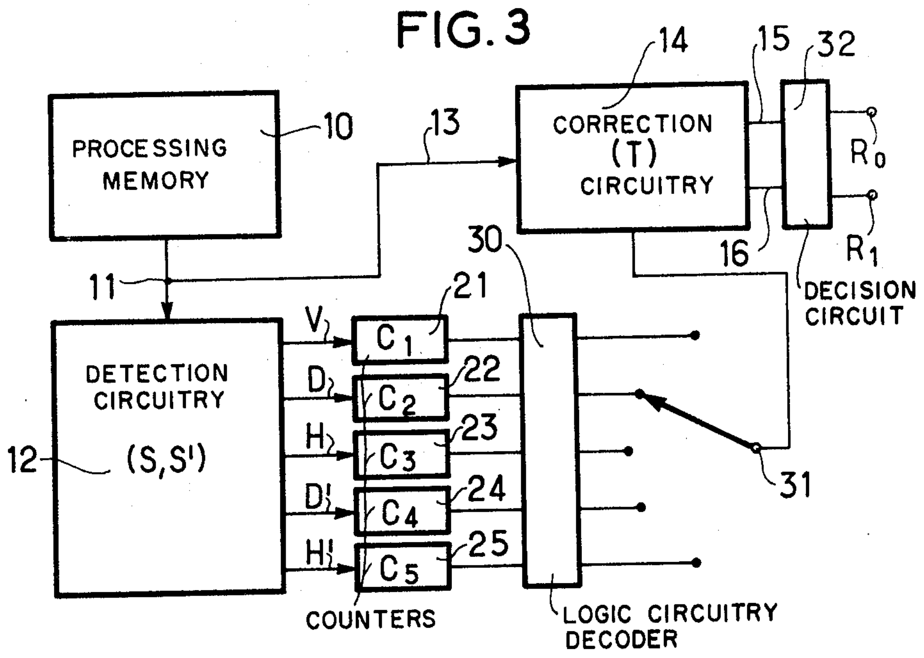
FIG. 3 is a block diagram of the installation according to the invention.

FIG. 3 gives a schematic diagram of the entire assembly for detection and correction of the validated direction.

10 is the processing memory, whose contents may be investigated by transfer along arrow 11 into the detection circuits 12, then corrected by transfer along arrow 13 into the correction circuits 14 with outputs 15 and 16.

The validated direction detection circuits 12 are essentially realizations of the logic functions *V, D, H, D', H'* given above. Each time one of these functions has the value 1, an associated counter (21, 22, 23, 24, 25), which has been reset to zero at the beginning of the rapid horizontal displacement, advances by one unit. When the horizontal movement is finished, that is to say when all the contents of a register $R_n$ have been examined, the state of each of the counters represents the correlation value of the corresponding direction. A direction will be validated if the state of the corresponding counter is greater than or equal to $(m-4+1)/(2)$ (the subtraction of 4 is due to the fact that it is necessary to stop before reaching the edges, as it not the window assembly S (FIG. 1) falls partly outside the memory). For $m = 15$, the above reference value is 6.

Because of the existence of the condition $G = H.H'$, the validation condition for H is less rigorous: experiment has shown that 4is the most favorable value instead of 6.

It is possible to adopt a more elaborate validation decision rule: for example, instead of validating all the counters attaining a certain threshold (6 in the present case), that counter having the highest state could be validated, this being achieved with the aid of a comparator which is not shown in the diagram.

As a function of the states of the various counters 21 to 25, decoder logic circuits 30 validate the direction corresponding to the one which registers at least 6. In general, only one direction will be validated. However, it is not impossible for there to be more than one. In this case if the corrections are coincident, the resultant correction is adopted; if the corrections are not coincident, no correction is made, as this case represents a blot or similar mark.

The validation of a direction is represented symbolically by a switch 31, which is set to the validated direction.

The contents of the memory 10 are then controlled according to a window selected in the element 14, which will be described in detail with reference to FIG. 4. There results in a decision element 32 a correction order for the division U, whether white ($R_0$) or black ($R_1$).

Figure 4:
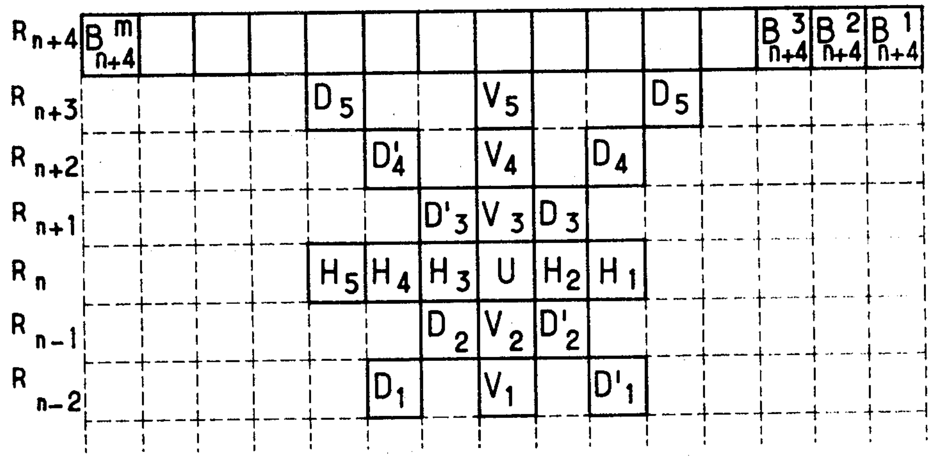
FIG. 4 shows the position of the corrector windows in the memory.
Figure 5A:
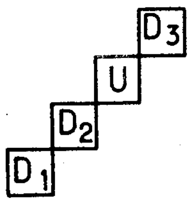
Figure 5B:
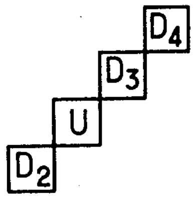
Figure 5C:
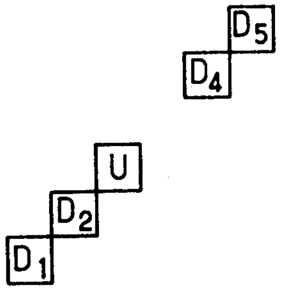

The assembly of correction windows T is shown in FIG. 4. The oblong windows are longer than in the assembly 5 (FIG. 1) to permit correction of double interferences: they comprise 5 divisions in addition to U, being:

V1, V2, V3, V4, V5 for the vertical direction V;

D1 to D5 for the direction D;

H1 to H5 for the direction H;

D'1 to D'5 for the direction D';

In the window of assembly T which corresponds to the direction validated by the detector subassembly, a predominant valence is sought.

FIGS. *5a* and *5b* show how the valency in the division U is corrected in the direction D: the corresponding direction must be validated and the three adjacent divisions must have the same valence.

FIG. *5c* shows in the same way how the decision to correct the first division of a double interference is taken: the oblong window must be longer in order to prevent extending a print line unknowingly.

In all cases, depending on whether the line detected in the validated direction is black or white, the corrector controls resetting to 0 or 1 respectively.

The logic conditions for the correction are as follows:

Validation V : (V1V2V3 + V2V3V4 + V1V2V4V5)
Validation D : (D1D2D3 + D2D3D4 + D1D2D4D5)
Validation H.H': (H1H2H3 + H2H3H4 + H1H2H4H5)
Validation D' : (D'1D'2D'3 + D'2D'3D'4 + D'1D'2D'4D'5) for resetting U to 1, and
Validation V : ($\overline{V1}\,\overline{V2}\,\overline{V3}+\overline{V2}\,\overline{V3}\,\overline{V4}+\overline{V1}\,\overline{V2}\,\overline{V4}\,\overline{V5}$)
Validation D : ($\overline{D1}\,\overline{D2}\,\overline{D3}+\overline{D2}\,\overline{D3}\,\overline{D4}+\overline{D1}\,\overline{D2}\,\overline{D4}\,\overline{D5}$)
Validation H.H' : ($\overline{H1}\,\overline{H2}\,\overline{H3}+\overline{H2}\,\overline{H3}\,\overline{H4}+\overline{H1}\,\overline{H2}\,\overline{H4}\,\overline{H5}$)
Validation D': $\overline{D'1}\,\overline{D'2}\,\overline{D'3}+\overline{D'2}\,\overline{D'3}\,\overline{D'4}+\overline{D'1}\,\overline{D'2}\,\overline{D'4}\,\overline{D'5}$) for resetting U to 0.

In each bracket, the first two terms correspond to correction of a single interference, the third term corresponds to the correction of a double interference.

FIG. 6 - To avoid correction of an image in a zone where it is not well defined, the corrector does not operate if it receives simultaneously orders for resetting to zero and to one.

FIG. 6 shows in more detail the circuit 32 of FIG. 3 used to obtain this facility : 33 and 35 are inverters, 34 and 36 are two AND gates which are blocked by an input 1, inverted to zero by the corresponding inverter, appearing on the input complementary to the AND gate considered. If 1 appears on both inputs 15 and 16, no correction order is transmitted.

FIGS. *7a* and *7b* - FIG. *7a* shows part of the memory including numerous interference signals. FIG. *7b* shows the print lines after removal of the interferences by the device of the invention.

I claim:

1. An arrangement for correcting data stored in a memory and representative of a pattern constituted of a plurality of lines, the data being in the form of logic signals representative of said pattern and being stored in a matrix array of logic elements each having a state representing black and white zones of the pattern, each logic element occupying a division in the matrix array, the arrangement comprising first subassembly means for detecting sequences of the same logic signal value including means for passing the stored data successively through detection logic circuitry defining pattern windows each constituted by a group of logic matrix divisions and defining a respective direction on the pattern; means for selecting one of said directions as the validated direction in accordance with the sequences detected; and second subassembly means responsive to said selecting means for passing the stored data through correction logic circuitry defining a selected direction pattern window constituted by a group of logic matrix divisions and having the validated direction including means for passing the data through the correction logic circuitry to compensate for deviations of the pattern direction from the validated direction.

2. An arrangement according to claim 1, wherein the correction logic circuitry is formed of a larger number of divisions than the detection logic circuitry in the validated direction.

3. An arrangement according to claim 1, wherein said first subassembly means comprises shifting means for shifting the data contained in the memory through the detection logic circuitry, said shifting means being in the form of shift registers looped on themselves, and counting means for counting sequences of the same logic signal value viewed through said logic circuitry representing each detection window.

4. An arrangement as claimed in claim 3, wherein said logic circuitry in said first subassembly means includes logic circuit means for detecting sequences of the same logic signal value, in accordance with predetermined logic functions, passing through each detection logic circuit.

5. An arrangement as claimed in claim 4, comprising: logic means cooperating with the counting means to select a detection window pattern having the validated direction, in accordance with the counted values for each window pattern, the selected window pattern being that for which the counted value exceeds a predetermined limit; means for selecting a correction logic circuit representative of a window pattern having the validated direction; and means for shifting the stored data through the selected correction logic circuit.

6. An arrangement as claimed in claim 5, in which said first subassembly means further includes auxiliary detection logic circuits, each corresponding to a particular detection window pattern but having an end division of the detection logic circuitry replaced by one of two adjacent divisions.

7. An arrangement as claimed in claim 6, wherein said second subassembly means includes auxiliary correction logic circuitry representative of a window pattern aligned with the direction in which the stored data is shifted through the correction logic circuitry and through which the data is passed after passing through said correction logic circuitry.

8. An arrangement as claimed in claim 7, wherein said second subassembly means contains logic circuit means for emitting, in accordance with predetermined logic functions, correction signals for a memory division viewed through the selected correction logic circuit.

9. An arrangement as claimed in claim 8, and further including blocking logic means for preventing transmission of a correction signal if two contradictory correction signals are given by the correction logic circuitry.

10. An arrangement as claimed in claim 9, wherein said blocking logic means comprises two AND gates each having two inputs, each receiving on one input a correction signal and on the other input the complement of the correction signal received by said one input of the other AND gate.

11. An arrangement as claimed in claim 1, wherein said logic circuitry in said first subassembly means includes logic circuit means for detecting sequences of the same logic signal value, in accordance with predetermined logic functions, passing through each detection logic circuit.

12. An arrangement as claimed in claim 3, comprising: logic means cooperating with the counting means to select a detection logic circuit representative of a window pattern having the validated direction, in accordance with the counted values for each window pattern, the selected window pattern being that for which the counted value exceeds a predetermined limit; means for selecting a window correction logic circuit representative of a window pattern having the validated direction; and means for shifting the stored data through the selected correction logic circuit.

13. An arrangement as claimed in claim 1, in which said first subassembly means further includes auxiliary detection logic circuits, each corresponding to a particular detection window pattern but having an end division of the detection logic circuit replaced by one of two adjacent divisions.

14. An arrangement as claimed in claim 1, wherein said second subassembly means includes auxiliary correction logic circuitry representative of a window pattern aligned with the direction in which the stored data is shifted through the correction logic circuitry and through which the data is passed after passing through said correction logic circuits.

15. An arrangement as claimed in claim 1, wherein said second subassembly means contains logic circuit means for emitting, in accordance with predetermined logic functions, correction signals for a memory division viewed through the selected correction logic circuit.

16. An arrangement as claimed in claim 15, and further including blocking logic means for preventing transmission of a correction signal if two contradictory correction signals are given by the logic circuitry.

17. An arrangement as claimed in claim 16, wherein said blocking logic means comprising two AND gates each having two inputs, each receiving on one input a correction signal and on the other input the complement of the correction signal received by said one input of the other AND gate.

18. An arrangement as claimed in claim 15, wherein said second subassembly means includes auxiliary correction logic circuitry representative of a window pattern aligned with the direction in which the stored data is shifted through the correction logic circuitry and through which the data is passed after passing through said correction logic circuitry.

19. An arrangement as claimed in claim 12, in which said first subassembly means further includes auxiliary detection logic circuits, each corresponding to a particular detection window pattern but having an end division of the detection logic circuit replaced by one of two adjacent divisions.

20. An arrangement according to claim 8, wherein the correction logic circuitry is formed of a larger number of divisions than the detection logic circuitry in the validated direction.

* * * * *